United States Patent [19]

Coile et al.

[11] 4,315,481
[45] Feb. 16, 1982

[54] BREEDER HOUSE SYSTEM

[76] Inventors: Larry R. Coile, Rte. 1, Box 295c; Bob F. Coile, Rte. 1, Box 291, both of Comer, Ga. 30629

[21] Appl. No.: 206,365

[22] Filed: Nov. 13, 1980

[51] Int. Cl.³ .............................................. A01K 31/00
[52] U.S. Cl. ...................................................... 119/21
[58] Field of Search .......................... 119/21, 45 R, 48; 248/218.4, 219.3, 121; 52/73

[56] References Cited

U.S. PATENT DOCUMENTS

| | | |
|---|---|---|
| 1,166,928 | 1/1916 | Peirce, Jr. |
| 1,192,196 | 7/1916 | Hebert ............................. 119/45 R |
| 1,356,749 | 10/1920 | Sorg . |
| 1,412,566 | 4/1922 | Miller .............................. 119/45 R |
| 1,847,740 | 3/1932 | Woods . |
| 2,308,142 | 1/1943 | Alloway ................................. 304/11 |
| 2,612,864 | 10/1952 | Kummeth ............................. 119/45 |
| 2,658,475 | 11/1953 | Hobbs ................................... 119/45 |
| 2,728,324 | 12/1955 | Radocy ................................. 119/45 |
| 3,032,010 | 5/1962 | Kaegebein ............................ 119/21 |
| 3,062,185 | 11/1962 | Kurtz ..................................... 119/48 |
| 3,234,909 | 2/1966 | Graves et al. ......................... 119/45 |
| 3,916,591 | 11/1975 | Agterhof et al. .................... 52/73 X |
| 4,230,071 | 10/1980 | Phillips ................................. 119/21 |

Primary Examiner—Hugh R. Chamblee
Attorney, Agent, or Firm—Howson and Howson

[57] ABSTRACT

In a breeder house for chickens, nests are aligned on both sides of a center aisle with their entrance openings facing slatted platforms on the sides of the house. The nests are supported by brackets on roof-support stanchions and are positioned so that chickens can move underneath the nests from the platforms to the floor of the aisle. A hoist system is provided for simultaneously raising the nests to facilitate cleaning. Each of the brackets has a first part secured to a nest and a second part removably secured to a stanchion. The first and second parts can be readily separated by the removal of two bolts on each bracket to permit the nests to be raised with one bracket part remaining attached to the nest and the other part remaining attached to the stanchion. The part attached to the stanchion is held by the engagement of L-shaped slots with projections on the stanchion and can be removed readily.

6 Claims, 6 Drawing Figures

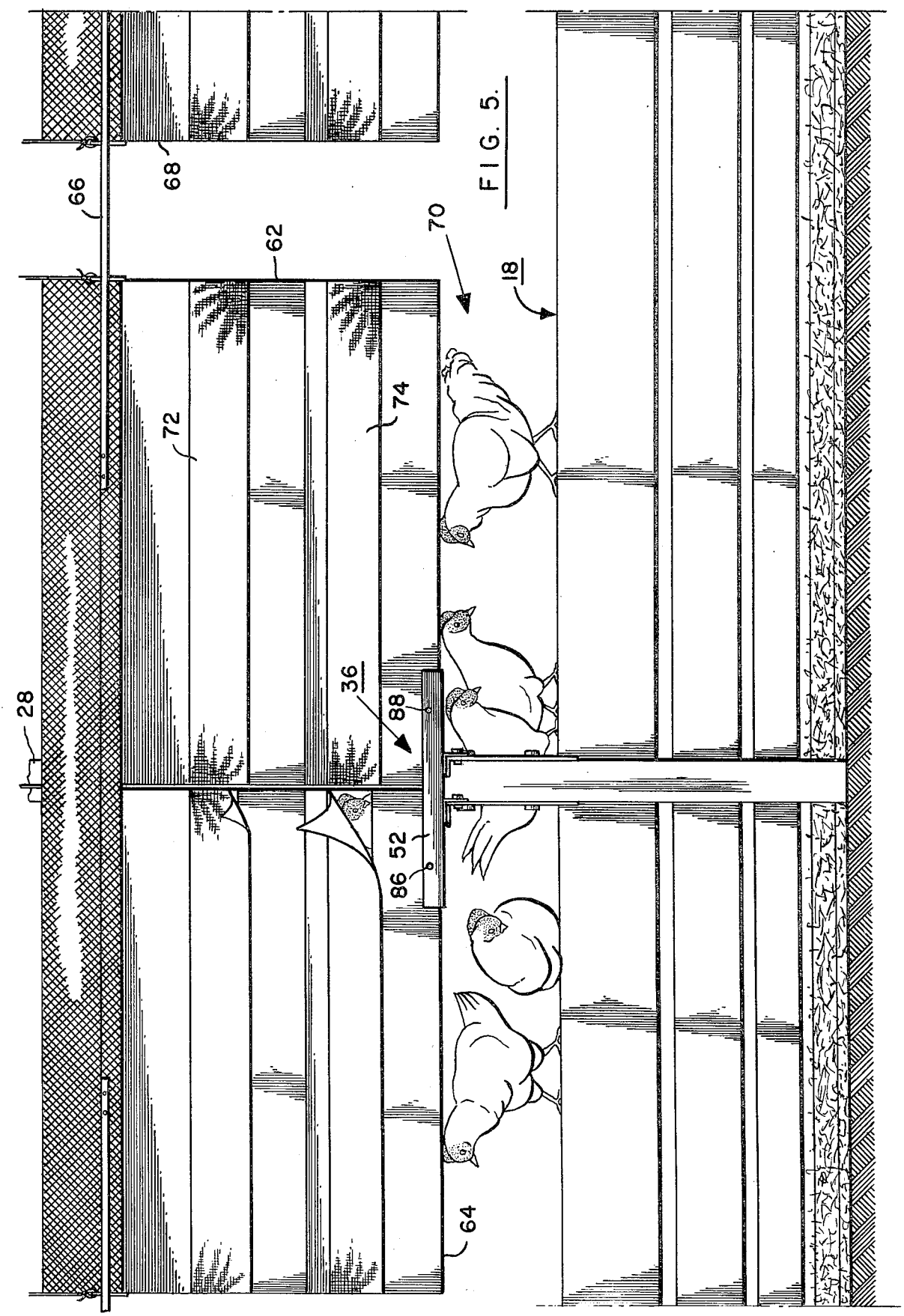

BREEDER HOUSE SYSTEM

BRIEF SUMMARY OF THE INVENTION

This invention relates to improvements in breeder houses for chickens, and particularly to a novel nest arrangement and nest supporting structure which facilitate egg collection, allow a large number of nests to be accommodated in a given area, and at the same time permit chickens to move freely throughout the house.

A conventional breeder house is an elongated structure, usually at least several hundred feet in length, having a peaked roof, a scratch area covered with a layer of wood shavings and extending a central aisle in the lengthwise direction through the house, and slatted platforms, known as "slats," along opposite sides of the scratch area, on which feeding and watering mechanisms are situated.

Nests used in breeder houses are typically sheet metal enclosures having two rows of six compartments each, one row above another. The compartments are open, at least on one side of the nest, in order to permit hens to enter and leave the nest. Perches are provided adjacent the entrance openings. Typically, the upper row of compartments is provided with a perch consisting of a single slat, while the lower compartment is provided with a perch consisting of two slats.

In the conventional breeder house, the nests are arranged in back-to-back pairs, with their rows of compartments extending perpendicular to the direction of elongation of the house. One end of each pair of nests rests on a slatted platform, which extends along the length of the house, while the other end is supported by a chain from the roof. Thus, the pairs of nests extend from the platforms out over the scratch area.

In general, chickens feed and drink, and prefer to sleep, on the slatted platforms. However, they tend to prefer the scratch area for mating. Mating normally takes place in the afternoon, and usually a large number of chickens desire to move from the platform to the scratch area in a relatively short period of time. The conventional arrangements of nests allows plenty of room for the chickens to move from the platforms to the scratch area and from the scratch area to the platforms. However, the conventional nest arrangement makes manual egg collection difficult, and does not readily lend itself to automated egg collection. With the conventional arrangement, it is also difficult to add more shavings to the shavings in the nests. Further, with the conventional arrangement, hens in the nests are easily disturbed by persons moving between the nests to collect eggs. The disturbance of the hens frequently results in the breakage of eggs.

In accordance with this invention, the nests on each side of the scratch area are arranged in alignment with each other along the scratch area, with their entrance sides facing the platforms. Here again, the platforms extend along the sides of the house. The spacings between nests can be relatively small, or even non-existent. The nests are positioned, however, so that the lower edges of their entrance sides are spaced from the nearest edge of the adjacent platform by a distance sufficient to permit chickens to move readily from the platform to the scratch area and from the scratch area to the platform, through the spaces between the bottoms of the entrance sides of the nests and the nearest edge of the platform.

The sides of the nests opposite the entrance sides are provided with openings to facilitate manual egg collection, and flexible curtains are used to provide privacy for the laying hens in the nests. With this arrangement, egg collection is readily carried out from the scratch area of the breeder house, in substantially less time than was required with the conventional system. Furthermore, the new nest arrangement minimizes the disturbance of the hens, and therefore reduces egg breakage. The new arrangement also reduces labor involved in adding shavings to the nests. The invention provides all of the above advantages, and at the same time permits the chickens to move about freely within the breeder house. It also provides the hens with better access to the nests, since the nests face the platforms.

In the preferred form of the invention, the nests are supported by brackets extending laterally over the scratch area from the roof support stanchions. Hoist means are provided to permit the nests to be raised upwardly away from the brackets for the cleaning of the slat area and for access to the feeding and watering devices on the slatted platforms. The bracket arms are, preferably, in the form of two easily detached elements, one element remaining on the stanchion and the other remaining attached to the nest when the nest is raised.

The principal object of this invention is to provide an improved breeder house system which reduces the labor involved in egg collection and in adding to the shavings in the nests, but which does not materially restrict the movement of chickens within the breeder house.

It is also an object of the invention to provide an improved breeder house system which reduces the disturbance of the laying hens during egg collection, and thereby reduces the breakage of eggs.

Another object of this invention is to achieve either or both of the foregoing objects while at the same time providing a large number of nests in a given area, thereby achieving an efficient use of available space.

Still another object of this invention is to provide a breeder house system which achieves one or more of the above-stated objects and in which easy access can nevertheless be had to the slatted platforms for cleaning and maintenance.

Various other objects and advantages of the improved breeder system will be apparent from the follownng detailed description when read in conjunction with the drawings.

BRIEF DESCRIPTION OF THE DRAWINGS

FIG. 5 is an elevation of part of the nest array, as viewed from the scratch area.

DETAILED DESCRIPTION

Figure 1:
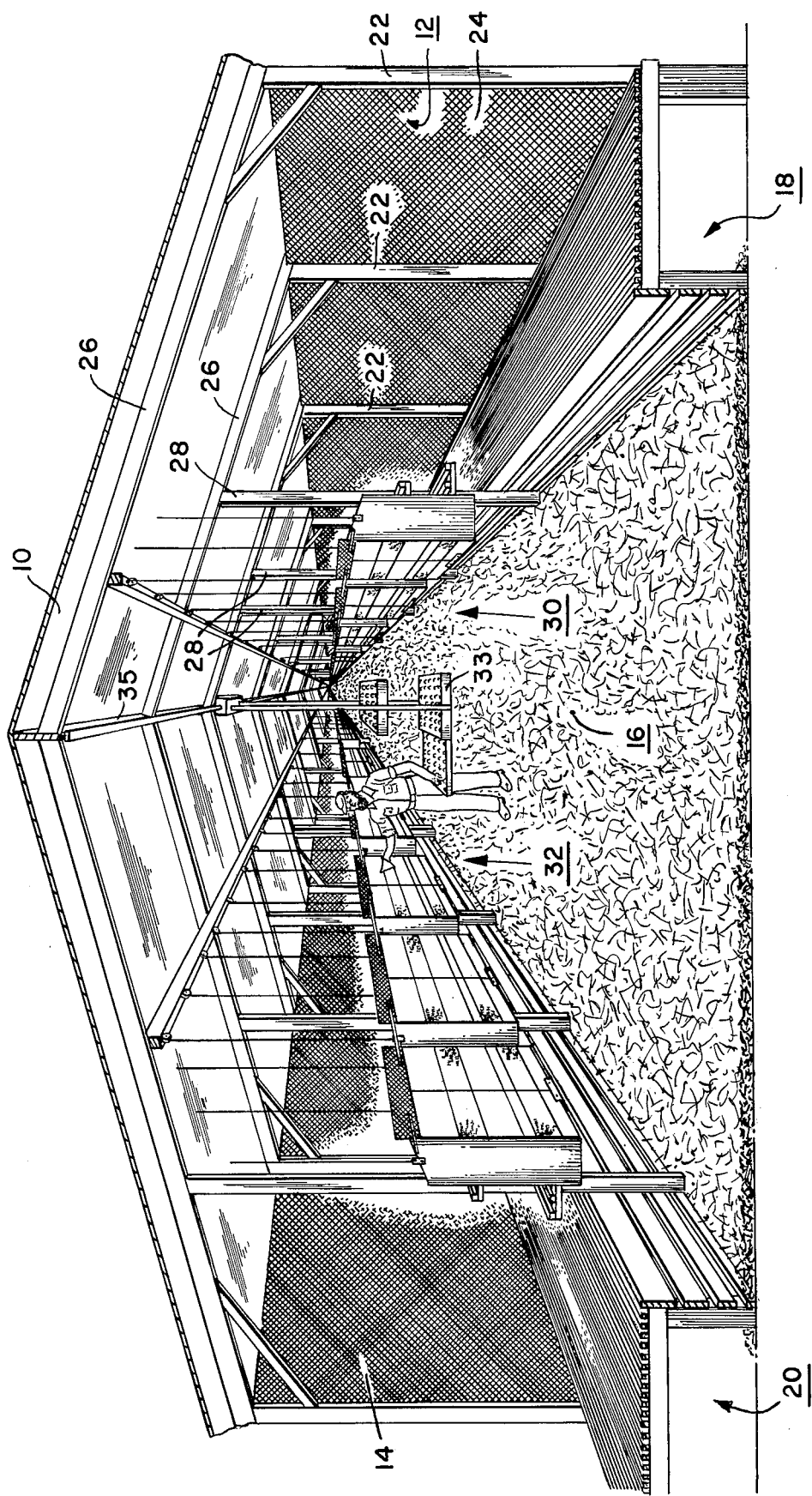
FIG. 1 is a perspective view showing the interior of a breeder house constructed and arranged in accordance with the invention.

The breeder house, as shown in FIG. 1, is an elongated structure, typically several hundred feet in length, having a roof 10 and side walls 12 and 14. The side walls are formed from wire mesh, and curtains (not shown in FIG. 1) are provided along the side walls for temperature control. A scratch area 16 extends as a central aisle throughout the length of the building, and is covered with wood shavings. Raised platforms 18 and 20 are provided on either side of the scratch area. These platforms are typically about two feet high. They extend substantially the full length of the building and comprise wooden slats which extend in the lengthwise direction. Roof support stanchions 22 are provided along side walls 12 and 14. The wire mesh side wall material is indicated at 24. Transverse roof beams are shown at 26. These transverse beams are supported by stanchions 28 which are disposed along the edges of the raised platforms on either side of the scratch area. A nest array 30 is provided along one side of the scratch area, and a similar nest array 32 is provided along the other side. An egg collection trolley 33 is suspended from a track on a centrally located longitudinal beam 35. As shown in FIG. 1, the egg collection trolley has a laterally extending tray. This tray holds cardboard egg flats near nest array 32 so that the breeder house operator can collect eggs rapidly. It can be transferred to the other side of the trolley for collection of eggs from nest array 30. The laterally extending tray also allows the operator to push the trolley along with his body. Thus, it frees both hands for egg collection.

Figure 2:
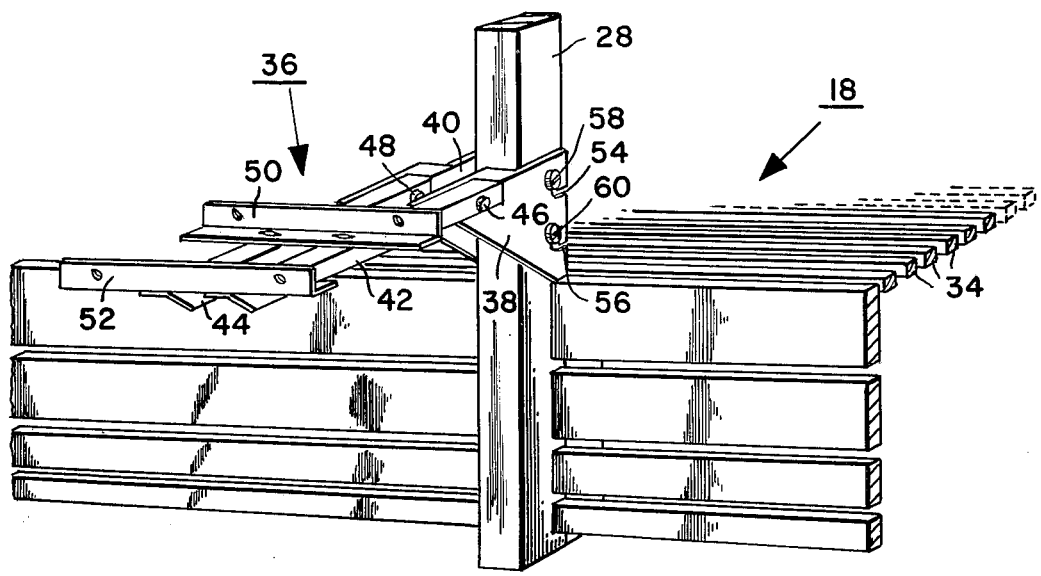
FIG. 2 is an oblique perspective view illustrating the manner in which a nest support bracket is secured to a roof-support stanchion.
Figure 3:
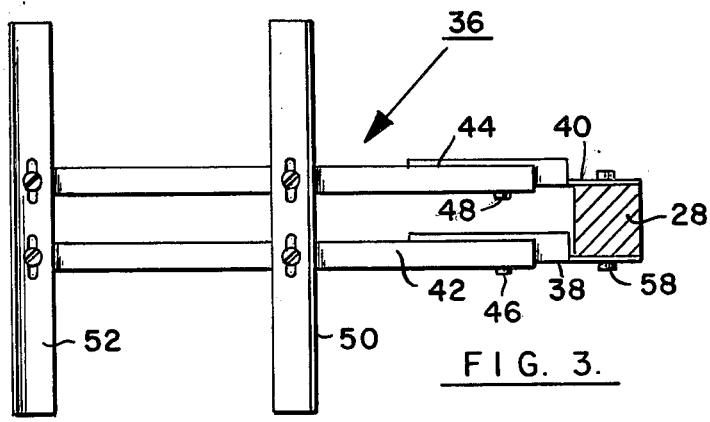
FIG. 3 is a horizontal section taken through a roof-support stanchion, showing the nest-support bracket in top plan view.

FIG. 2 shows slats 34 of platform 18, and also shows a nest supporting bracket 36 secured to a stanchion 28 along the edge of slatted platform 18. Bracket 36 comprises two bracket members 38 and 40 having generally triangular, plate-like sections to which angles 42 and 44 are secured respectively by bolts 46 and 48. Nest-receiving angles 50 and 52 are bolted to angles 42 and 44, as best shown in FIG. 3. The bolt holes in all four angles are preferably in the form of elongated slots to permit adjustment so that the bracket elements can be made to fit the nests.

Bracket member 38 has two L-shaped slots 54 and 56, as shown in FIG. 2. These L-shaped slots receive the shanks of heavy supporting screws 58 and 60, these screws projecting outwardly from stanchion 28. Bracket member 40 is similarly secured on the opposite side of stanchion 28.

Referring again to FIG. 3, the horizontal parts of angles 42 and 44 overlie horizontally extending stiffening flanges formed at the upper edges of the plate-like sections of members 38 and 40. The engagement of the horizontal parts of angles 42 and 44 with the upper edges of the plate-like sections prevents angles 42 and 44 from rotating about the bolt axes. Thus, each of angles 42 and 44 is rigidly locked to one of members 38 and 40 by a single bolt. The assembly consisting of angles 42, 44, 50 and 52 can be readily detached from bracket members 38 and 40 by the removal of bolts 46 and 48.

Figure 4:
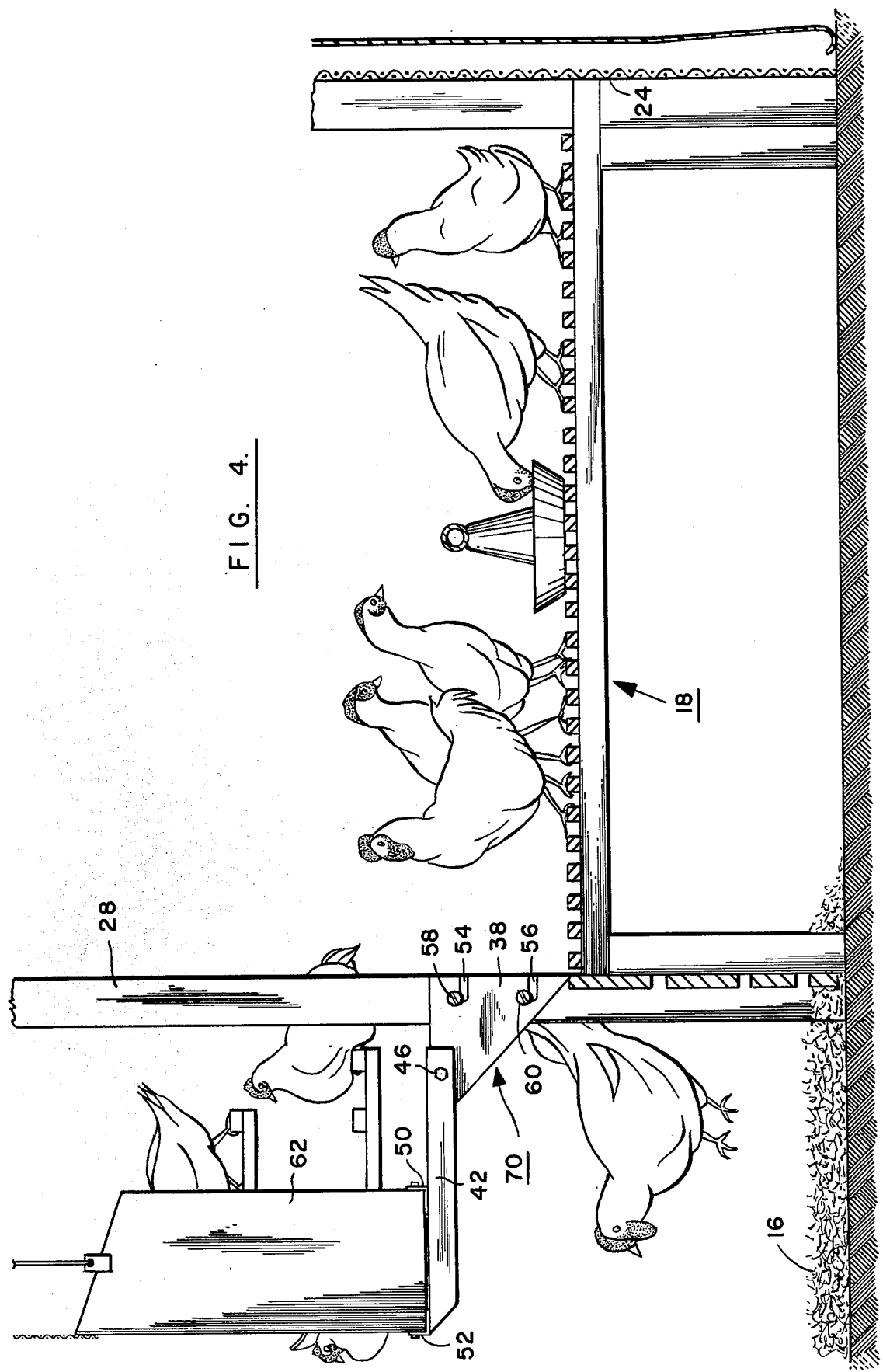
FIG. 4 is a sectional view taken on a vertical plane perpendicular to the direction of elongation of the breeder house, showing the relationship between a nest and a slatted platform.

Referring to FIGS. 4 and 5, stanchion 28 supports a pair of nests 62 and 64. These nests are held together by bolts extending through their abutting walls so that what is supported on stanchion 28 is essentially a single long nest. As shown in FIG. 5, nest 62 is connected to a nest 68 of an adjacent nest assembly by a rigid connection bar 66. Preferably all of the nests in each row are connected together in this manner.

The bracket structure supports the array of nests at a location such that a space 70 is provided between the lower edge of the entrance side of the nest and the near edge of platform 18. Space 70 is sufficiently large that chickens can move from the platform onto scratch area 16, and from the scratch area back to the platform, as shown in FIG. 4. Preferably, the nests are spaced horizontally from the edge of the platform, as shown in FIG. 4, so tht they overlie the scratch area. Positioning the nests in this way not only provides a gap for movement of chickens underneath the nests, but it also maximizes the available slat area by avoiding overlap of the slats by the perches of the nests. The bottoms of the nests are also desirably somewhat higher than the platform so that the chickens can move underneath the nests from the platform to the scratch area and back to the platform by a combination of horizontal and vertical movement rather than by vertical movement alone. Because the nests are spaced from the platform, the spaces between adjacent nests, e.g. the space between nests 62 and 68 as shown in FIG. 5, can be relatively small or even non-existent without impairing the ability of chickens to move about. Consequently, a large number of nests can be accommodated in the building.

From FIG. 4 it will be observed that the perches of the nests in the nest array are parallel to the platform edge. As a result, the hens can readily move from the platform into the nests without having to move in the lengthwise direction along the perches where other hens may be in the way. Since the perches are parallel to the platform edge, there is no need for the hens to fly directly from the floor of the scratch area to the perches as was often the case with the former system where the perches were perpendicular to the slats. With the system of the invention a hen uses the slatted platform as a step, and can easily and safely move from the scratch area to a nest by way of the platform.

Manual egg collection is carried out from the scratch area by opening flexible curtains 72 and 74 (FIG. 5) in the manner illustrated in FIG. 1. Curtains 72 and 74 provide some privacy for the laying hens, which is highly desirable. Since the curtains are used, and also since the individuals collecting eggs do not have to move between nests, disturbance of the hens is minimized and breakage of eggs is accordingly reduced.

The arrangement of nests in accordance with the invention also lends itself to automated egg collection. Automated egg collection can be carried out by the use of specially constructed nests, arranged in the manner shown in FIG. 1 and provided with conveyor means which can run along either side of each row of nests.

Figure 6:
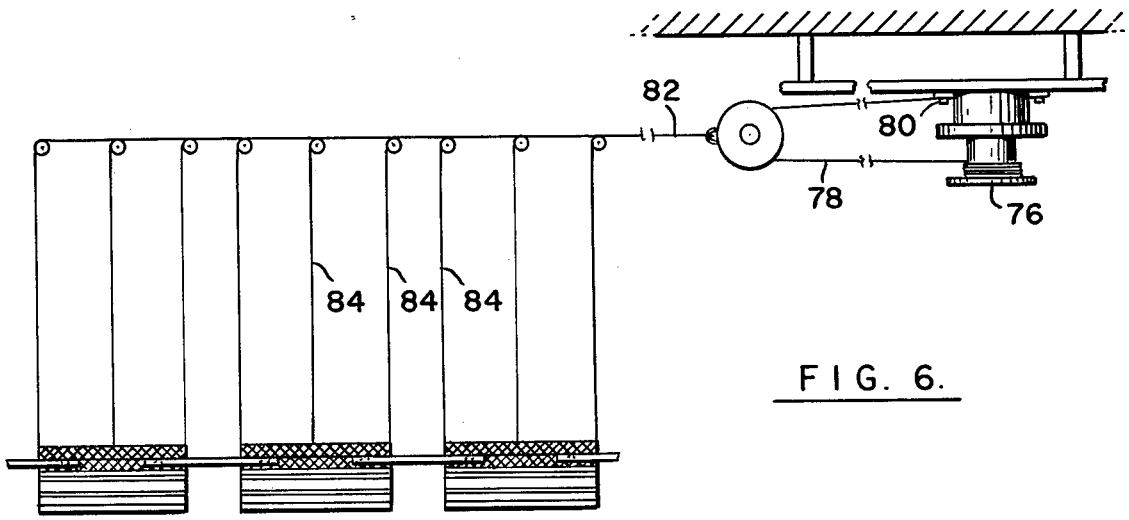
FIG. 6 is a schematic diagram showing part of a nest hoisting system used in accordance with the invention.

As illustrated schematically in FIG. 6, the nests are raised by a winch 76 which pulls a cable 78, one end of which is anchored at 80. Cable 78 runs over a pulley, and a cable 82, attached to the pulley has a number of individual cables 84 attached to it. These individual cables run over sheaves supported on a beam running along the roof of the building, and are secured to the nests in a row. Operation of the winch raises a number of nest simultaneously. A single winch can be used to raise all of the nests on one side of the breeder house.

The nests are secured to the bracket by means of stove bolts 86 and 88 (FIG. 5) which extend through the vertical portion of angle 52, and by similar bolts which extend through the vertical portion of angle 50. These bolts can be removed to allow the nests to be raised away from the entire bracket for access to the slats and the feeding and drinking equipment on the slats. a more convenient way to effect raising of the nests, however, is to leave angles 50 and 52 attached to the nests and to remove bolts 46 and 48. This allows the angles 42, 44, 50 and 52 to remain with the nests as they are raised. Thus the number of fasteners which need to be removed is reduced, and at the same time, the major portions of the brackets are moved out of the way along with the nests.

After the nests are raised, bracket members 38 and 40 (FIG. 3) can readily be removed from stanchion 28 by disengaging their L-shaped slots from the screws on the stanchion. This will prevent members 38 and 40 from projecting out over the scratch area and possibly causing injury to persons working in the building. The L-shaped slots also allow the entire bracket to be removed as a unit in the case where the nest is detached from the bracket.

From the foregoing, it will be apparent that the invention provides a unique breeder house system having many advantages both with regard to efficiency of operation and with regard to the contentment of the chickens.

Numerous modifications can be made to the specific system described above. For example, while the stanchions 28 in the foregoing description serve as roof-supporting stanchions, in a clear span house the rows of nests can be supported on short stanchions which do not extend to the roof. The short stanchions can be secured to the sides of the slatted platforms or braced in any suitable way so that they are able to support the weight of the nests. As an example of another modification, the nest assembly held on a given bracket can be a single long nest rather than two conventional nests bolted together. Automated egg collection conveyors can be provided if desired. Bracket members 38 and 40 can be secured to the stanchions in various ways other than by the use of L-shaped slots. For example, instead of L-shaped slots, keyhole-shaped slots could be used. Various other modifications, can be made in the specific bracket configuration and in the overall configuration of the breeder house without departing from the invention as defined in the following claims.

We claim:

1. A breeder house for chickens comprising an elongated enclosure having a scratch area extending in the lengthwise direction, a raised platform extending along at least one side of the scratch area, and an array of nests also arranged along the same side of the scratch area, each nest comprising an enclosure with a plurality of internal compartments, one side of said enclosure serving as an entrance side and having an array of entrance openings permitting hens to enter and exit from the compartments and perch means adjacent said entrance openings, and said nests also being provided with means permitting the collection of eggs from said compartments, characterized by means supporting said nests substantially in alignment with one another along said scratch area with their entrance sides facing said platform and with the bottoms of said nests being sufficiently close to the platform to permit hens to move readily from the platform to the perch means, yet sufficiently spaced from the nearest edge of the platform to permit chickens to move from the platform to the scratch area and from the scratch area to the platform, through the spaces between the bottoms of the entrance sides of the nests and the nearest edge of the platform, said breeder house having a row of stanchions arranged along said nearest edge of the platform and extending upwardly from the floor of the breeder house, and having bracket means comprising a plurality of brackets, one bracket being secured to each stanchion and extending laterally therefrom toward the scratch area, the bracket means on said stanchions providing vertical support for said array of nests, and each bracket comprising a first part secured to a nest and a second part secured to a stanchion, said first and second parts being rigidly but removably secured together, and having means for simultaneously raising a plurality of nests upwardly along with the first bracket parts secured thereto.

2. A breeder house according to claim 1 in which each of said second parts is removably secured to a stanchion.

3. A breeder house according to claim 2 in which each of the second parts of each bracket comprises a pair of parallel, plate-like members embracing a stanchion, each plate-like member having two L-shaped slots, and the stanchion corresponding to each bracket having four projections, one L-shaped slot being engaged with each one of said projections.

4. A breeder house for chickens comprising an elongated enclosure having a scratch area extending in the lengthwise direction, a raised platform extending along at least one side of the scratch area, and an array of nests also arranged along the same side of the scratch area, each nest comprising an enclosure with a plurality of internal compartments, one side of said enclosure serving as an entrance side and having an array of entrance openings permitting hens to enter and exit from the compartments and perch means adjacent said entrance openings, and said nests also being provided with means permitting the collection of eggs from said compartments, characterized by means supporting said nests substantially in alignment with one another along said scratch area with their entrance sides facing said platform and with the bottoms of said nests being sufficiently close to the platform to permit hens to move readily from the platform to the perch means, yet sufficiently spaced from the nearest edge of the platform to permit chickens to move from the platform to the scratch area and from the scratch area to the platform, through the spaces between the bottoms of the entrance sides of the nests and the nearest edge of the platform, said breeder house having a row of stanchions arranged along said nearest edge of the platform and extending upwardly from the floor of the breeder house, and having bracket means comprising a plurality of brackets, one bracket being secured to each stanchion and extending laterally therefrom toward the scratch area, the bracket means on said stanchions providing vertical support for said array of nests, and in which said array of nests rests on said bracket means, and having hoist means for simultaneously raising nests upwardly from a plurality of said brackets.

5. A breeder house according to claim 4 in which each bracket is removably secured to one of said stanchions.

6. A breeder house according to claim 5 in which each bracket comprises two parallel, plate-like members embracing a stanchion, each plate-like member having two L-shaped slots, and its corresponding stanchion having four projections, one L-shaped slot being engaged with each one of said projections.

* * * * *